STEPHEN P. DYER.
Improvement in Evaporators.

No. 114,278.　　　　　　　　　　　　　　Patented May 2, 1871.

Witnesses:
E. Wolff
Wm. H. C. Smith.

Inventor:
S. P. Dyer.
per Mmm
Attorneys.

United States Patent Office.

STEPHEN P. DYER, OF ANKNEY TOWN, OHIO.

Letters Patent No. 114,278, dated May 2, 1871.

IMPROVEMENT IN EVAPORATORS.

The Schedule referred to in these Letters Patent and making part of the same.

*To all whom it may concern:*

Be it known that I, STEPHEN P. DYER, of Ankney Town, in the county of Knox and State of Ohio, have invented a new and useful Improvement in Evaporators; and I do hereby declare that the following is a full, clear, and exact description thereof, which will enable others skilled in the art to make and use the same, reference being had to the accompanying drawing forming part of this specification.

This invention relates to improvements in the construction of evaporators, calculated to afford efficient evaporators, which may be cheaply constructed, as hereinafter described.

Similar letters of reference indicate corresponding parts.

Figure 1:
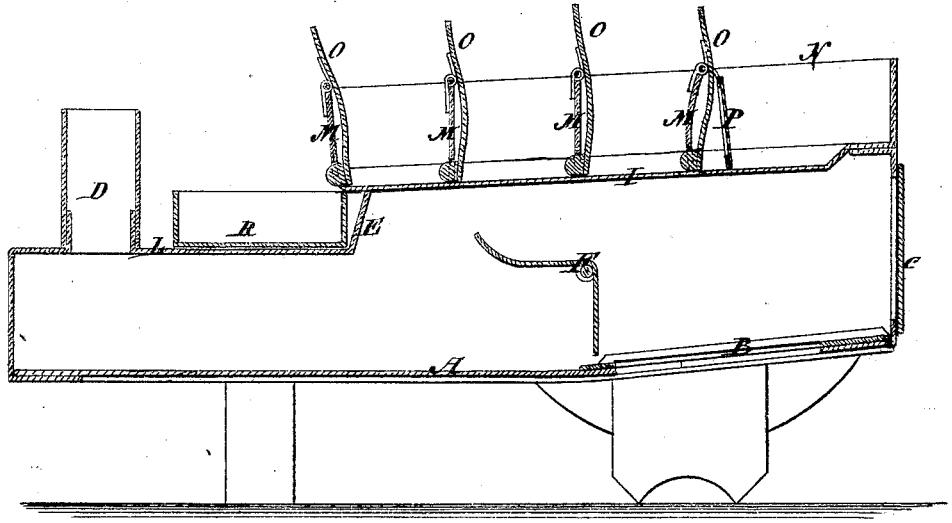
Figure 1 is a longitudinal section of my improved evaporator.
Figure 2:
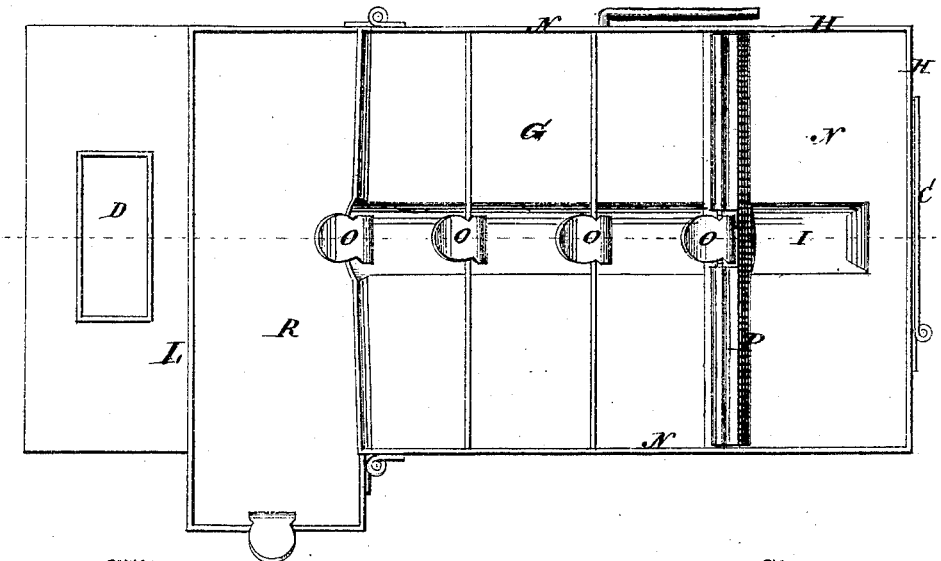
Figure 2 is a plan of the same.

A is a large covered rectangular case of sheet metal, having a fire-grate, B, in the bottom near one end, which has a door, C, for supplying the fuel.

D is a smoke-pipe rising from the top at the end opposite the door.

At E the top is considerably depressed, the said depression continuing to the rear end.

F is a valve or damper consisting of an angle-plate suspended at the angle on a cranked rod extending across the case from side to side behind the grate, which damper may be turned to cause the product of combustion to rise up above the shaft and impinge against the top of the case, which forms the bottom of the principal evaporating-pan; or it may be caused to pass under the shaft and flow along the bottom of the case.

The highest part G of the cover is surrounded by sides H, making it a pan for holding the fluid to be evaporated, and a groove, I, is formed along the center of this top, from front to rear, both for strengthening it and forming a draw in which the liquid may be entirely drawn off into the finishing-pan K, arranged on the depressed part L of the cover, so that the part G, which descends toward it, will deliver into it.

The large pan is divided into five, more or less sections by the dividing-plates M, each of which has a passage for allowing the liquid to flow from one to the other in its passage from the first section N to the pan K, said passages being closed by gates or valves O, which may be raised as required.

P is a filter of reticulated substance of any kind, arranged in the first section a little in advance of the partition and parallel with it, or thereabout. It is placed sufficiently in advance of the said partition to provide space for steam to rise between it and said partition, to act on it in a way to clean it of the matter collecting in it, from the substance passing through it.

The pan K is placed on the top of the heater so as to be readily removed for emptying when required.

Having thus described my invention,

I claim as new and desire to secure by Letters Patent—

The evaporating apparatus, consisting of the heater and pans, the one being grooved in the bottom and provided with the dividing plates, the valves, and filter, and the other arranged to receive the liquid from the first, and for being readily removed for emptying, all substantially as specified.

STEPHEN P. DYER.

Witnesses:
AARON L. GARBER,
ELIHU S. GARBER.